United States Patent [19]

Dore, III

[11] Patent Number: 5,292,580

[45] Date of Patent: Mar. 8, 1994

[54] PLASTIC SHEET FOR A BOAT HULL AND THE LIKE AND METHOD OF MAKING IT

[75] Inventor: Charles H. Dore, III, Wilmington, Del.

[73] Assignee: C.C. Omega Chemical, Inc., Moorestown, N.J.

[21] Appl. No.: 906,582

[22] Filed: Jun. 30, 1992

Related U.S. Application Data

[62] Division of Ser. No. 616,239, Nov. 20, 1990, Pat. No. 5,126,172.

[51] Int. Cl.$^5$ .......................... B32B 5/28; B32B 5/30; B32B 31/12
[52] U.S. Cl. .................................. 428/283; 428/325; 428/328; 428/331; 428/332
[58] Field of Search ............... 428/286, 287, 283, 325, 428/328, 331, 332; 239/89; 427/421

[56] References Cited

U.S. PATENT DOCUMENTS 5,126,172 6/1992 Dore .................................. 427/421

*Primary Examiner*—James C. Cannon
*Attorney, Agent, or Firm*—John F. A. Earley; John F. A. Earley, III

[57] ABSTRACT

A FRP laminate composed of synthetic resin material, which contains spheres, and short strands of chopped fibers mixed into the resin/sphere blend in criss-cross, hodge-podge fashion, the sphere members and high application pressure combining to force down any upstanding chopped fibers and to make the chopped fibers lie flat in the resin layer and to knock air out of the resin layer, said sphere members comprising a plurality of high density spheres. A method of making a FRP laminate for a boat hull or the like includes spraying into a mold a synthetic resin liquid containing spheres while simultaneously applying chopped glass fibers into the fan-shaped stream of resin/sphere blend with the chopped fibers being randomly distributed in the resin layer in a hodge-podge fashion. The inclusion of the spheres in the resin provides body to the resin itself, so that, with the higher than normal spray pressure being used, there is an impacting force exerted against the glass fibers which forces them into a horizontal, randomly aligned position, thus achieving the end result of a subsequent-to-application rolling process without the need for the rolling process. The forceful application of the resin/sphere blend and the chopped fibers is sufficient to eliminate the trapped air which occurs in normal spray applications of resin and chopped fibers. An apparatus for molding FRP laminate composed of high viscosity synthetic resin, cut fibers, and spheres includes a spray gun, a high pressure spray pump upstream of the spray gun, a fluid transfer pump upstream of said spray pump, and an accumulator between the high pressure pump and the spray gun to eliminate pulsing which otherwise occurs when the spray pump reverses the direction of its stroke, whereby the high viscosity resin is properly fed from its storage container to the spray gun and a smooth steady spray is obtained.

7 Claims, 1 Drawing Sheet

PLASTIC SHEET FOR A BOAT HULL AND THE LIKE AND METHOD OF MAKING IT

This is a divisional of co-pending U.S. patent application Ser. No. 07/616,239 filed on Nov. 20, 1990 now U.S. Pat. No. 512,617.

FIELD OF THE INVENTION

This invention relates to a modification to the typical synthetic resin materials used in a spray application in its liquid form in conjunction with chopped strands of fiberglass or other fibrous reinforcing material, which resin/fiber combination is used extensively in various manufacturing applications, such as, but not limited to, boat hulls, shower, tub, hot-tub, spa, and swimming pools, camper and van assemblies, pleasure boats, building cladding panels, etc. This invention also relates to a modification in the application method of the resin/fiber material.

DESCRIPTION OF THE PRIOR ART

Many products today are constructed of synthetic resin material reinforced by fibers. The most common fiber used is glass fiber, such as Fiberglass, and the most common synthetic resin used is a polyester resin. Products fashioned from this combination of resin and fibers are commonly called FRP (Fiber Reinforced Plastic) products.

The fibers may also be Kevlar man-made fibers or carbon fibers, but, because of the cost and complexity in applying these materials, they are used only in a small percentage of fiber-reinforced products. Kevlar is a registered trademark of E.I. dupont deNemours and Company, Wilmington, Delaware.

The synthetic resin material may also be an epoxy resin, a vinyl ester resin, a urethane, a urethane/polyester resin, or any other suitable synthetic resinous material.

In many of the products constructed of the fiber-reinforced synthetic resin, both the fiber and the synthetic resin are applied to the mold used to determine the shape of the product by means of a spray of the resin in which short lengths of the fiber are imbedded.

The resin is syphoned or drawn from a storage container and fed through a pump creating high pressure through a spray gun assembly while a catalyzing agent is fed from another storage container into the stream of resin, ether just after the resin leaves the spray tip attached to the nozzle of the gun (known in the trade as an "external mix unit"), or is fed into the stream of resin passing through the feeder hose and into a static mixer shortly before it reaches the spray tip (known in the trade as an "internal mix unit"). The spray tips are designed to cause the existing material to spread into a fan shape.

The short strands of fiber are generated from a multistrand string of the fiber being used (most commonly, fiber-glass which is known in the trade as "gun-roving") which is drawn from a spool of the fiber into an assembly which is attached to the spray gun, and which chops the fibers into predetermined short lengths (suitable lengths range from 0.250" to 2.000") and simultaneously blows them into the fan-shaped stream of resin shortly after the resin leaves the spray nozzle.

The fibers in this method of application are imbedded in the resin on the mold in a random fashion. Maximum strength of the finished part is achieved only if the fibers are thoroughly wet by the resin, and all trapped air is removed from the part being formed. The finished parts usually require a relatively smooth inner surface, but, in the as applied state, as a result of the random nature of the fiber imbedding in the resin, many fiber ends protrude from the surface, creating an unacceptable surface condition. Substantial air entrapment occurs in this method of resin-fiber application, which must be removed.

In order to ensure maximum wet-out of the fibers, removal of trapped air, and creation of a relatively smooth inner surface, common practice is to roll the resin-fiber layer while the resin is still in an uncured, liquid state. Because of the complexity of the shape of most products, this rolling procedure is normally done manually, adding a highly labor-intensive step to the manufacturing process of the product being formed, and providing for the possibility of uneven or poor quality of the finished product.

It has long been the desire of users of the resin-chopped fiber spray application method to be able to eliminate this labor-intensive rolling step from their production process. This invention accomplishes this for many such users.

SUMMARY OF THE INVENTION

In products or parts formed from synthetic resin material reinforced by short lengths of fiber which are applied to the product or part simultaneously with the resin in a spray application, it is an object of this invention to eliminate the labor-intensive roll-out step in the manufacturing process.

It is another object of this invention to ensure a more consistent quality in such products or parts.

It is another object of this invention to reduce the time required to finish such products or parts, thereby allowing more uses of the mold in a given time.

DESCRIPTION OF THE INVENTION

Figure 1:
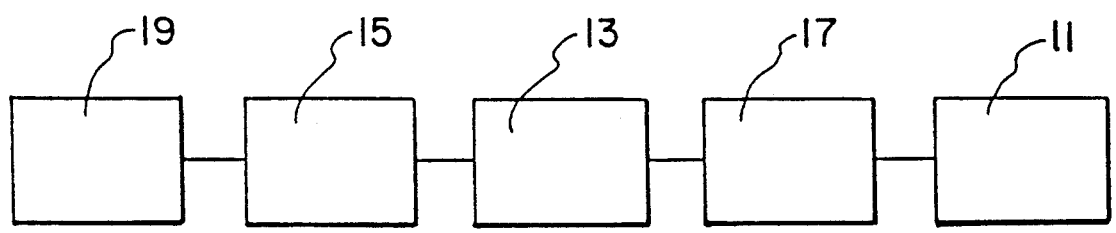
FIG. 1 is a diagrammatic view of the apparatus for molding sheets of high viscosity synthetic resin, cut fibers, and spheres, in accordance with the invention.

It has been found that if prior to the application of the synthetic resin material to the mold, the resin has had blended into it a high percentage by volume of relatively high density microspheres or other high density, bulky fillers, all of a sufficiently large diameter (hereinafter referred to as "spheres"), composed of glass, mineral, aluminum silicate, or other materials, and that if this blend of resin and spheres is sprayed at higher spray pressures (such as 400 psi to 2000 psi) than normally used (180 psi to 360 psi) in the application of chopped fibers and resin via spray, the resulting impact forces generated by the spheres upon the chopped fibers causes the fibers to form into a non-uniform but horizontally oriented position, with few if any fiber ends protruding from the surface. The high spray pressure and the sphere bombardment also effectively eliminate any trapped air, and serve also to aid in the thorough wetting of the short fibers of reinforcing material.

Thus, by the inclusion of particles with suitable body and density in the resin being sprayed, coupled with equipment modifications to permit more than normal application pressure of the highly viscous resin-sphere blends, it becomes possible to eliminate the labor intensive hand-rolling process normally required when applying resin-chopped fiber simultaneously by the spray method, while producing a more consistent product quality-wise. This presents a significant improvement in an application process that has been in extensive use in many industries for over forty-five years.

The method of making a FRP laminate for a boat hull or the like, comprises the steps of spraying a synthetic resin liquid into a mold to form a layer of resin, simultaneously applying chopped glass fibers to the mold with the chopped fibers being randomly distributed in the resin layer in a hodge-podge fashion with some fibers standing up in the resin layer and extending outside the resin layer, and spraying heavy spheres onto the resin layer to knock down any upstanding fibers to make them lie flat in the resin layer and to knock air out of the resin layer.

The spheres comprise 30% to 60% by volume of the sheet, and the specific gravity of the spheres is greater than 0.025. The spheres are 30 to 600 microns in diameter, and they may be composed of mineral, glass, aluminum silicate, or other high density, bulky fillers.

The chopped fibers are preferably made of glass and are known as glass fibers.

The presently preferred spheres are SCOTCHLITE glass bubbles as sold by 3M, St. Paul, Minnesota. SCOTCHLITE glass bubbles have as an ingredient soda lime borosilicate glass (amorphous silicate), and a particularly preferred bubble type is B37/2000.

The blend of resin and spheres has a viscosity too high to allow proper feeding from its storage container 19 when using standard resin spray equipment. It was found that adequate, continuous flow of the blend could be had by the addition of a fluid transfer pump 15 (such as a bellows pump) to the feed line prior to the high pressure spray pump 13. Other methods of delivering material in an adequate, continuous flow to the high pressure pump can be used, such as a follower plate (plunger) used to force material out of a drum up through a tube in the center of the follower plate. It also was found to be necessary to add an accumulator 17 between the high pressure pump 13 and the spray gun 11 to eliminate pulsing which otherwise occurs when the high pressure pump 13 reverses the direction of its stroke. Without these equipment modifications, a smooth, steady spray does not occur.

In the resin-sphere blend application equipment, a fluid transfer pump 15 has been incorporated into the standard resin spraying equipment prior to the high pressure pump 13 so as to be able to withdraw the viscous resin-sphere blend from its storage container 19 and deliver it in a satisfactory continuous stream to the high pressure pump 13 used to generate the high spray pressure needed to deliver a commercially acceptable volume of the resin-sphere blend through standard spray nozzles.

Also, an oversized accumulating chamber 17 has been added between the high pressure pump 13 and the spray gun 11 to reduce the pulsing action otherwise caused by the time lag occurring by the reversal of the direction of the high pressure pump piston.

I claim:

1. A FRP laminate comprising
   a layer of synthetic resin material,
   short strands of chopped fibers mixed into the resin in criss-cross, hodge-podge fashion, and
   sphere means mixed into the chopped fibers and the resin to force down any upstanding chopped fibers and to make the chopped fibers lie flat in the resin layer and to force air out of the resin layer,
   said sphere means comprising a plurality of high density spheres.

2. The FRP laminate of claim 1, said spheres comprising 30% to 60% by volume of the sheet.

3. The FRP laminate of claim 1,
   the specific gravity of the spheres being greater than 0.025.

4. The FRP laminate of claim 1, the spheres being 30 to 600 microns in diameter.

5. The FRP laminate of claim 1,
   the spheres being composed of mineral, glass, aluminum silicate, or other high density, bulky fillers.

6. The FRP laminate of claim 1,
   the chopped fibers being made of glass.

7. A FRP laminate comprising,
   a layer of synthetic resin material,
   short strands of chopped fibers mixed into the resin in criss-cross, hodge-podge fashion, and
   sphere means mixed into the chopped fibers and the resin to force down any upstanding chopped fibers and to make the chopped fibers lie flat in the resin layer and to force air out of the resin layer,
   said sphere means comprising a plurality of hiqh density spheres,
   said spheres comprising 30% to 60% by volume of the sheet,
   the specific gravity of the spheres being greater than 0.025,
   the spheres being 30 to 600 microns in diameter,
   the spheres being composed of mineral, glass, or aluminum silicate, and
   the chopped fibers being made of glass.

* * * * *